United States Patent
Roberts et al.

(10) Patent No.: US 11,061,572 B2
(45) Date of Patent: Jul. 13, 2021

(54) MEMORY OBJECT TAGGED MEMORY MONITORING METHOD AND SYSTEM

(71) Applicant: Advanced Micro Devices, Inc., Sunnyvale, CA (US)

(72) Inventors: David A. Roberts, Boxborough, MA (US); Michael Ignatowski, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 140 days.

(21) Appl. No.: 15/136,851

(22) Filed: Apr. 22, 2016

(65) Prior Publication Data
US 2017/0308297 A1    Oct. 26, 2017

(51) Int. Cl.
*G06F 3/06* (2006.01)
*G06F 9/50* (2006.01)
*G06F 12/1027* (2016.01)
*G06F 12/1045* (2016.01)

(52) U.S. Cl.
CPC ......... *G06F 3/061* (2013.01); *G06F 3/0653* (2013.01); *G06F 3/0685* (2013.01); *G06F 9/5016* (2013.01); *G06F 12/1027* (2013.01); *G06F 12/1045* (2013.01); *G06F 2212/1041* (2013.01); *G06F 2212/68* (2013.01); *G06F 2212/684* (2013.01)

(58) Field of Classification Search
CPC ..... G06F 3/061; G06F 3/0653; G06F 2212/68
See application file for complete search history.

(56) References Cited

U.S. PATENT DOCUMENTS

| | | | |
|---|---|---|---|
| 6,286,092 B1* | 9/2001 | Frank | G06F 12/1009 711/207 |
| 2002/0049824 A1* | 4/2002 | Wilson | G06F 12/0813 709/213 |
| 2009/0172243 A1 | 7/2009 | Champagne et al. | |
| 2012/0272029 A1* | 10/2012 | Zhang | G06F 11/3466 711/165 |
| 2013/0024597 A1* | 1/2013 | Loh | G06F 12/0897 711/3 |

(Continued)

FOREIGN PATENT DOCUMENTS

| | | |
|---|---|---|
| EP | 2 437 433 A2 | 4/2012 |
| JP | 2007-094871 A2 | 4/2007 |

(Continued)

OTHER PUBLICATIONS

International Search Report dated Sep. 25, 2017.

*Primary Examiner* — Michelle T Bechtold
(74) *Attorney, Agent, or Firm* — Volpe Koenig

(57) ABSTRACT

Described are a method and processing apparatus to tag and track objects related to memory allocation calls. An application or software adds a tag to a memory allocation call to enable object level tracking. An entry is made into an object tracking table, which stores the tag and a variety of statistics related to the object and associated memory devices. The object statistics may be queried by the application to tune power/performance characteristics either by the application making runtime placement decisions, or by off-line code tuning based on a previous run. The application may add a tag to a memory allocation call to specify the type of memory characteristics requested based on the object statistics.

19 Claims, 3 Drawing Sheets

(56) References Cited

U.S. PATENT DOCUMENTS

| | | | |
|---|---|---|---|
| 2013/0132699 A1 | 5/2013 | Vaishampayan et al. | |
| 2013/0290382 A1 | 10/2013 | Adachi et al. | |
| 2014/0032985 A1 | 1/2014 | Tekumalla et al. | |
| 2014/0236911 A1* | 8/2014 | Bodwin | G06F 17/30309 |
| | | | 707/695 |
| 2014/0245065 A1 | 8/2014 | Weiner | |
| 2014/0281110 A1* | 9/2014 | Duluk, Jr. | G06F 13/404 |
| | | | 710/313 |
| 2014/0282589 A1* | 9/2014 | Kuang | G06F 9/5016 |
| | | | 718/104 |
| 2015/0032985 A1* | 1/2015 | Hsia | G06F 12/02 |
| | | | 711/170 |
| 2015/0242312 A1 | 8/2015 | Ideue et al. | |
| 2015/0301951 A1* | 10/2015 | Bybell | G06F 12/1027 |
| | | | 711/207 |
| 2016/0078075 A1 | 3/2016 | Karunakaran et al. | |
| 2016/0124802 A1* | 5/2016 | Gabor | G06F 11/10 |
| | | | 714/807 |

FOREIGN PATENT DOCUMENTS

| | | | |
|---|---|---|---|
| JP | 2012-118834 A2 | 6/2012 | |
| JP | 2013-109756 A2 | 6/2013 | |
| WO | 2010/127983 A1 | 11/2010 | |
| WO | WO 2010127983 A1 * | 11/2010 | G06F 11/3644 |
| WO | 2013/074201 A1 | 5/2013 | |
| WO | 2014/171002 A1 | 10/2014 | |

* cited by examiner

MEMORY OBJECT TAGGED MEMORY MONITORING METHOD AND SYSTEM

GOVERNMENT RIGHTS CLAUSE

This invention was made with Government support under Prime Contract Number DE-AC5207NA27344, Subcontract Number B600716 awarded by DOE. The Government has certain rights in this invention.

TECHNICAL FIELD

The disclosed implementations are generally directed to processors, and in particular, to memory management and processing.

BACKGROUND

Application or software controlled heterogeneous memory systems allow a user or operating system to choose where to place data. These types of heterogeneous memory systems may have multiple memory devices tailored to different access patterns, e.g. random, sequential, high-bandwidth, high-capacity, or low power. Under a user-controlled environment, memory allocations are performed by a function such as malloc( ) in C, for example. Applications typically manage their data at an object level and expect the data to be contiguously allocated to a memory device. However, data is tracked and allocated by the operating system at a page level. There is currently no way to inform the application about object-level performance at a memory controller level. For example, there is no way an object with a high random access, high bandwidth or low read/write ratio can be allocated to an appropriately power/performance-tuned memory area. This type of directed object allocation at a user level is currently not possible.

BRIEF DESCRIPTION OF THE DRAWINGS

A more detailed understanding may be had from the following description, given by way of example in conjunction with the accompanying drawings wherein.

DETAILED DESCRIPTION

Described herein is a method and processing apparatus to tag and track objects related to memory allocation calls. The method and processing apparatus allow an application or software to identify objects, (i.e. a range of memory addresses), that the software is interested in tracking or monitoring. An object tracking table may keep track of the object statistics. The software may then read back the accumulated object statistics and make optimizations based on an analysis of the object statistics. The method and processing apparatus provides an automatic way of tracking objects and statistics that are of interest to the application. As described herein below, the method and processing apparatus supports precise data mapping decisions at object- and memory-level granularity without operating system intervention, improves accuracy over page-granularity monitoring and captures side-effect traffic behavior (cache eviction-triggered reads and writes) not seen at the virtual address translation level, (i.e. at the translation lookaside buffer).

In general, an application or software adds a tag to a memory allocation call to enable object level tracking. An entry is made into an object tracking table, which stores the tag and a variety of statistics related to the object and associated memory devices. The object statistics may be queried by the application to tune power/performance characteristics either by the application making runtime placement decisions, or by off-line code tuning based on a previous run. The application may add a tag to a memory allocation call to specify the type of memory characteristics requested based on the object statistics.

Figure 1:
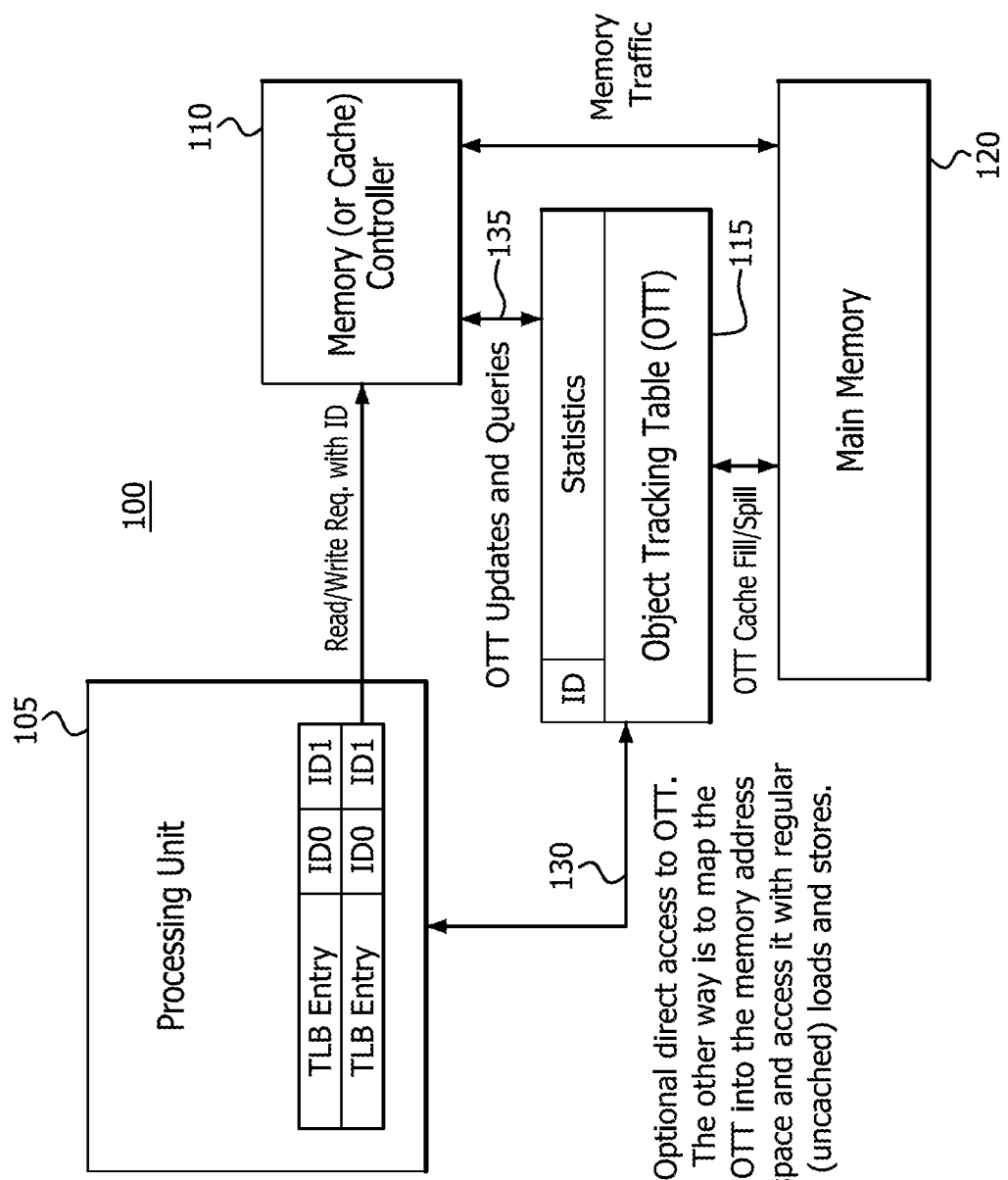
FIG. 1 is an example block diagram of a processing apparatus in accordance with certain implementations.

FIG. 1 is an example block diagram of a processing apparatus 100 in accordance with certain implementations. The processing apparatus 100 includes a processing unit 105 that may be connected to a memory controller 110 and an object tracking table 115. The memory controller 110 may be connected to the object tracking table 115 and a main memory 120, which may be further connected to the object tracking table 115. Although FIG. 1 depicts a controller as the memory controller 110, the controller may be a cache controller or any similar device. Although FIG. 1 depicts a memory as the main memory 120, the memory may be a cache or any other similar device. It is understood that the processing apparatus 100 may include additional components not shown in FIG. 1.

It is noted that the described processing apparatus and method tracks on an object level basis. As is known, the application operates or runs in virtual address space. The operating system (OS) knows the corresponding physical addresses using a translation lookaside buffer (TLB), which may be located, for example, in the processing unit 105. Consequently, an object may be multiple pages, a page or less than a page and is therefore not tied to page resolution.

In general, an application or software, (i.e. a user level construct or device), may send a memory request or make a memory allocation function call. The memory allocation function call may provide a tag. The application may control which objects may need to be tracked by including the tag in the memory allocation function call, i.e. a malloc (size, TAG) function call. This type of memory allocation function call may register the object for tracking in the object tracking table 115. In addition, multiple memory controllers may be handled by registering the same address range and tag in every controller. When the application or an operating system (OS) running, for example, on the processing unit 105, reads the object statistics for the given tag, the application or OS may get separate statistics as seen by each controller. Although the example herein describes adding a tag to a memory allocation function call, such tags or qualifiers may also be added to variable definitions within a program, (i.e. not using a malloc), so that a complier can specify the proper tags when it allocates the memory for these variables. This may permit the ability to collect and query statistics on the object usage with respect to these variables. Although the description herein refers to application, user program, software or OS as a requesting and/or optimizing entity for the collected statistics, other similar constructs, entities or modules may be used and collectively they may all be referred to as a user entity or user device.

Although the example herein describes adding a tag to a memory allocation function call, such tags or qualifiers may also be added to objects in an object storage system/architecture. In general, each object in object storage typically includes the data itself, a variable amount of metadata, and a globally unique identifier. The object and tag may be associated in an object allocation instruction for object storage. Alternatively, the tags described herein may be provided by the OS.

The tag may be an object identification (ID) parameter or a base pointer returned from the memory allocation function. A free list of unallocated object IDs or a pool of object IDs may be maintained by the application or by the OS for use by the applications. The list or pool may be globally used across the system. For example, the tags may be picked up from the TLBs on memory accesses, (i.e. the tags are stored as part of page table entries). The base pointer tag uses the start of the memory address associated with the object as the tag. For example, the tags may be associated with one or more address ranges and programmed into an object tracking table (OTT) as described herein below. If one object is composed of two ranges, two OTT entries may be allocated with the same tag which corresponds to the two ranges. When a program reads out the statistics from the OTT, the program will know both sets of statistics refer to the same object. In either case, the application and/or OS may append information to the tag such as a process ID or thread number. The process IDs are unique and may be added to avoid collisions between tags.

It is noted that in the base pointer tag, the pointer returned by the malloc allocation function is a virtual address. The OS would map the virtual address to the appropriate physical address and this translated/mapped physical address would be entered into the OTT. Similarly, when the application or program wants to read and review the statistics from the OTT based on a virtual address pointer, the application or program would have to make a call to the OS to perform a mapping/translation from the virtual address to the physical address to look up the entry in the OTT.

It is further noted that physical pages may be relocated by the OS at runtime. If the OS was to move a page physically, the OS would also need to update any matching physical address in the OTT in order to keep tracking the object.

Upon allocation of the requested memory, the OS may send an instruction or command, for example, to make an entry in the object tracking table 115. The instruction or command may be sent directly to the object tracking table 115 (via path 130) or indirectly to the object tracking table 115 via the memory controller 110 (via path 135). For path 135, the object tracking table 115 may be mapped into the memory address space and access to the object tracking table 115 may be done using regular (uncached) loads and stores. The table entry registers the memory addresses associated with the object and the tag. In effect, the entry into the object tracking table 115 alerts the memory controller 110 that when a memory address within the range of memory addresses is being referenced, requested, accessed and/or the like, (collectively "referenced"), the memory controller 110 should send an update to the object tracking table 115 for the relevant object or tag. For example, the memory controller 110 may count or track the number of reads, writes, bit-flips or any other similar events and send updates to the object tracking table 115.

To prevent looking up the tag on every memory reference, a cache of the most recent tag lookups may need to be kept somewhere. Every memory request has to check the TLB, which is a cache of the page tables. Therefore, the most recently used tags may be cached in the TLB and other tags may be loaded on a TLB miss. Consequently, for each memory request, the memory addresses and the tag may be sent to the memory controller 110. That is, the memory request may now carry the tag(s) from the TLB entry through to the memory controller 110 along with each read or write. The memory controller 110 may then update the object tracking table 115 without having to look-up the tag. Alternatively, the most recently used tag(s) may be cached in a separate table for each processor, or cached in a separate table at the memory controller 110. This may provide page granularity tracking. Multiple tags may be stored per page to support sub-page granularity object tracking.

The object tracking table 115 may be sized to accommodate the tracking of multiple concurrent tags. The object tracking table 115 may be treated as a cache similar to a TLB and may spill to main memory 120 if there are more active tags than the object tracking table 115 may hold. The object tracking table may be implemented as part of the main memory 120, as a cache or a similarly situated device.

Each entry in the object tracking table 115 may have a tag and a set of statistics. The statistics are tracked separately per tag and may include but are not limited to read and write counts, read/write ratio, bank conflicts, latency, row hit rate, bandwidth, sequential versus random fraction, command queue occupancy (queuing delay), coherency information, designating the object as read-only or modifiable, designating expected access pattern characteristics of the object (sequential, random, cache-friendly . . . ), designating object persistence, need to be kept in non-volatile memory, allocation location, need for specific memory device or memory device type, security features, which processors have been sharing it ("probe filter"), and reference frequency, for example.

The object tracking table 115 may also keep track of reads due to write misses as well as write-backs. These events may be tagged with the tag of the triggering memory request. In effect, the object tracking table 115 may capture and track "side effect" memory traffic spawned by accesses to a given tagged object. For example, if an application requests access to a cache line, the OS or TLB may apply a tag to the cache line, i.e. the object. To install the cache line, the cache controller may need to evict another cache line, (a cache eviction), that may not be related to the object. In certain situations, the application may want to track this cache eviction or write back to main memory, i.e. the "side effect," against the tag. Consequently, the application is aware of all traffic including the "side effects" associated with the request.

The OS or application may query the statistics for each independent object to adjust data placement decisions. This may be done, for example, by issuing a read entry command to the object tracking table 115. The application may then determine and designate which memory should be used for the next memory request.

A tag may be freed when the tag is explicitly freed by an application or the memory is de-allocated (e.g. a free( ) call). The tag and its statistics may be removed from the object tracking table 115. This may be done, for example, by issuing a delete entry command to the object tracking table 115.

If processing apparatus 100 included other memories in a memory hierarchy, then each level of the memory hierarchy may use an object tracking table to keep track of statistics associated with that level of memory.

The tags described herein may be used with confidence estimators to avoid tracking objects having an insignificant number of memory accesses. For example, confidence estimators may require at least N accesses to a given tag before an entry is made in the object tracking table 115. The OS may then ignore the tag and not create an entry in the object tracking table 115. The processing unit 105 or like device may keep track of recently accessed memory addresses and a threshold. When the number of accesses reaches or exceeds the threshold, the OS may then create an entry in the object tracking table 115.

Figure 2:
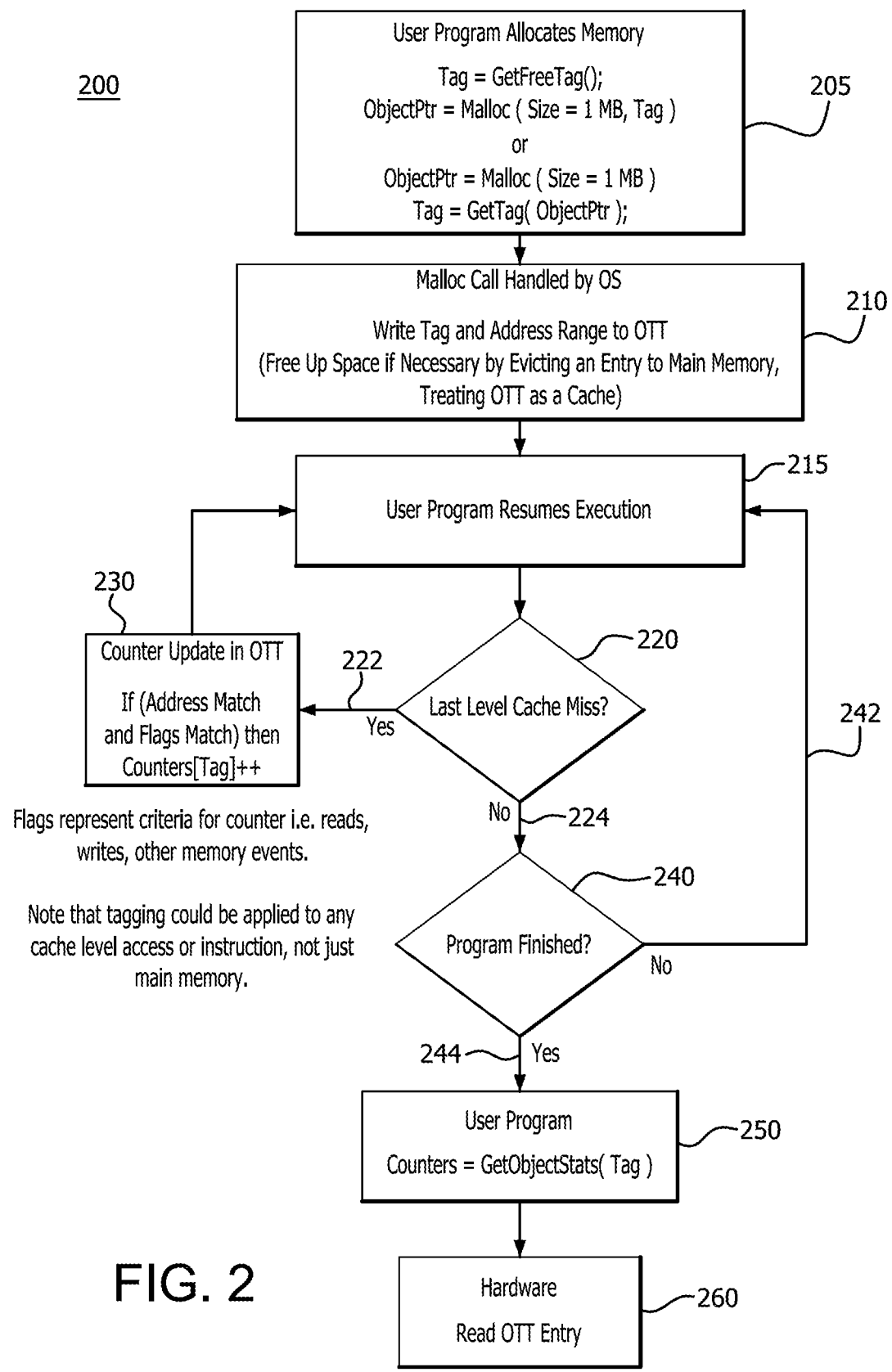
FIG. 2 is an example flowchart for tagging and tracking objects in accordance with certain implementations.

FIG. 2 is an example flowchart 200 for tagging and tracking objects in accordance with certain implementations. The flowchart 200 is illustrative only for tracking main memory accesses. Other flowcharts may be implemented for other types of memory and other types of commands or instructions without departing from the scope of the claims A user program, (e.g. an application), requests a memory allocation with a tag (block 205). The tag may be an object ID, (shown as Tag), or a tag derived from a base pointer, (shown as ObjectPtr). The memory allocation call is handled by the OS (block 210). Specifically, the address range and tag of the object is written to the object tracking table. If the object tracking table does not have sufficient space to hold the address range and tag, an entry may be evicted to main memory to free up space; in effect, treating the object tracking table as a cache. The user program then resumes execution (block 215). A determination is made whether the memory access is a last level cache miss (block 220). Specifically, a last-level cache miss is a memory access (load or store (cache write-back)). This ensures that only main memory accesses trigger a lookup in the object tracking table for the purposes of this example.

If it is a last level cache miss (block 222), then the counters in the object tracking table are updated (block 230). Specifically, if the address ranges and the events (e.g. reads, writes, or other memory events) match, then the appropriate counters are incremented. If it is not a last level cache miss (block 224), then it is determined if the program is finished (block 240). If the program is not finished (block 242), then the program continues execution (block 215) and the cycle starts over again. If the program is finished (block 244), the user program sends a command to obtain the object statistics from the object tracking table (block 250). The entry from the object tracking table is read and sent to the user program (block 260).

Whereas the description herein is to a processing unit accessing a memory controller, a direct memory access (DMA) controller may be used in accordance with the description above, for example, without departing from the scope of the claims. In this instance, the processing unit is bypassed and the application and DMA controller would interface directly to process the memory allocation request. The tags and object tracking table may be handled in accordance with the description stated herein.

Figure 3:
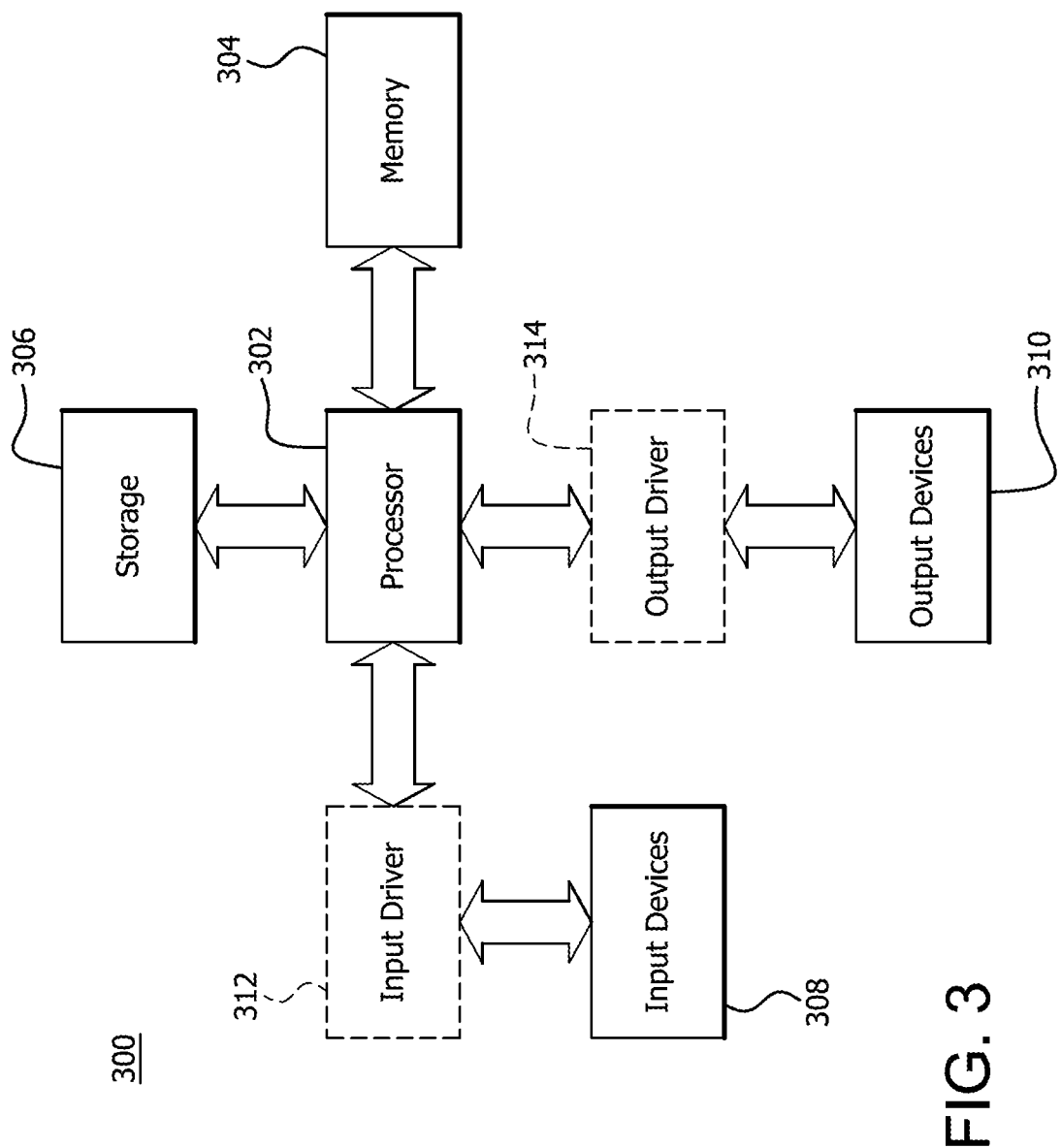
FIG. 3 is a block diagram of an example device for implementing the method and processing apparatus described herein.

FIG. 3 is a block diagram of an example device 300 in which one or more portions of one or more disclosed examples or implementations may be implemented. The device 300 may include, for example, a head mounted device, a server, a computer, a gaming device, a handheld device, a set-top box, a television, a mobile phone, or a tablet computer. The device 300 includes a processor 302, a memory 304, a storage 306, one or more input devices 308, and one or more output devices 310. The device 300 may also optionally include an input driver 312 and an output driver 314. It is understood that the device 300 may include additional components not shown in FIG. 3.

The processor 302 may include a central processing unit (CPU), a graphics processing unit (GPU), a CPU and GPU located on the same die, or one or more processor cores, wherein each processor core may be a CPU or a GPU. The memory 304 may be located on the same die as the processor 302, or may be located separately from the processor 302.

The memory 304 may include a volatile or non-volatile memory, for example, random access memory (RAM), dynamic RAM, or a cache.

The storage 306 may include a fixed or removable storage, for example, a hard disk drive, a solid state drive, an optical disk, or a flash drive. The input devices 308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 310 may include a display, a speaker, a printer, a haptic feedback device, one or more lights, an antenna, or a network connection (e.g., a wireless local area network card for transmission and/or reception of wireless IEEE 802 signals).

The input driver 312 communicates with the processor 302 and the input devices 308, and permits the processor 302 to receive input from the input devices 308. The output driver 314 communicates with the processor 302 and the output devices 310, and permits the processor 302 to send output to the output devices 310. It is noted that the input driver 312 and the output driver 314 are optional components, and that the device 300 will operate in the same manner if the input driver 312 and the output driver 314 are not present.

In general, a method for tracking an object includes associating a tag with the object, where the object is a memory address. The method further includes adding a table entry in an object tracking table for the object and the tag, where the object tracking table maintains a plurality of object statistics for a plurality of memory events. The method further includes updating, by a memory controller, an object statistic for an occurrence of an associated memory event and providing the plurality of object statistics to optimize memory utilization decisions. The object and tag may be associated in a memory allocation instruction. The object and tag may be associated in a variable definition. The tag may be associated with the object upon receipt of a memory allocation instruction. The table entries may be entered in multiple object tracking tables for the object and the tag, each object tracking table having an associated memory controller. The tag is one of an object identification parameter selected from a pool of object identification parameters or is based on a base pointer associated with the object. The tag includes at least one of a process identifier and a thread identifier. The table entry may be added if the object and tag have been accessed at least a predetermined number of times.

In general, a processing apparatus for tracking an object includes an object tracking table having a table entry for the object and a tag associated with the object, where the object is a memory address and where the object tracking table maintains a plurality of object statistics for a plurality of memory events, where the plurality of object statistics are used to optimize memory utilization decisions and a memory controller that updates the table entry for an object statistic for an occurrence of an associated memory event. The object and tag may be associated in a memory allocation instruction. The object and tag may be associated in a variable definition. The tag is associated with the object upon receipt of a memory allocation instruction. The object may be associated in an object allocation instruction for object storage. The processing apparatus further includes a plurality of object tracking tables and a plurality of memory controllers, where there may be a one-to-one correspondence between one of the plurality of object tracking tables and one of the plurality of memory controllers, and where table entries are entered in each object tracking table for the object and the tag. The tag is one of an object identification parameter selected from a pool of object identification parameters or is based on a base pointer associated with the object. The tag includes at least one of a process identifier and a thread identifier. The table entry is added if the object and tag have been accessed at least a predetermined number of times.

In general, a computer readable non-transitory medium including instructions which when executed in a processing apparatus cause the processing apparatus to execute a method for tracking an object, the method including associating a tag with the object, where the object is a memory address, adding a table entry in an object tracking table for the object and the tag, where the object tracking table maintains a plurality of object statistics for a plurality of memory events, updating, by a memory controller, an object statistic for an occurrence of an associated memory event and providing the plurality of object statistics to optimize memory utilization decisions. The tag is one of an object identification parameter selected from a pool of object identification parameters or is based on a base pointer associated with the object. The tag includes at least one of a process identifier and a thread identifier. The object and tag are associated in a memory allocation instruction. The object and are associated in an object allocation instruction for object storage.

In general and without limiting implementations described herein, a computer readable non-transitory medium including instructions which when executed in a processing apparatus cause the processing apparatus to execute a method for object tagged tracking.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the implementations.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for tracking an object to optimize allocation of a memory, the method comprising:
   counting a number of access requests to the object, wherein the object is a memory allocation having a sub-page size, the memory allocation comprising two or more address ranges of memory addresses;
   associating a tag with the object, wherein the tag is associated with memory addresses in the two or more address ranges, the two or more address ranges each comprising a plurality of memory addresses;
   adding the tag into a translation lookaside buffer entry associated with a memory address at which the object resides, wherein the translation lookaside buffer entry also includes an address translation associated with the memory address; and
   in response to the number of access requests exceeding a predetermined threshold:
      adding a separate table entry in an object tracking table for each address range of the two or more address ranges of the object and the tag, wherein each of the separate table entries in the object tracking table maintains a plurality of object statistics for a plurality of memory events;
      updating an object statistic for an occurrence of an associated memory event;
      designating a designated memory for a particular memory event; and
      allocating, in response to detecting the particular memory event, the memory based on the plurality of object statistics.

2. The method of claim 1, wherein the object and tag are associated in a memory allocation instruction.

3. The method of claim 1, wherein the object and tag are associated in a variable definition.

4. The method of claim 1, wherein the tag is associated with the object upon receipt of a memory allocation instruction.

5. The method of claim 1, wherein table entries are entered in multiple object tracking tables for the object and the tag, each object tracking table having an associated memory controller.

6. The method of claim 1, wherein the tag further comprises an object identification parameter selected from a pool of object identification parameters.

7. A processing apparatus for tracking an object to optimize allocation of a memory comprising:
   an object tracking table; and
   a memory controller that is communicatively coupled to the object tracking table, wherein the memory controller is configured to:
   count a number of access requests to the object, wherein the object is a memory allocation having a sub-page size, the memory allocation comprising two or more address ranges of memory addresses,
   associate a tag with the object, wherein the tag is associated with memory addresses in the two or more address ranges, the two or more address ranges each comprising a plurality of memory addresses,
   add the tag into a translation lookaside buffer entry associated with a memory address at which the object resides, wherein the translation lookaside buffer entry also includes an address translation associated with the memory address, and
   in response to the number of access requests exceeding a predetermined threshold:

add a separate table entry in an object tracking table for each address range of the two or more address ranges of the object and the tag, wherein each of the separate table entries in the object tracking table maintains a plurality of object statistics for a plurality of memory events, update an object statistic for an occurrence of an associated memory event, designate a designated memory for a particular memory event based on the plurality of object statistics, and allocate, in response to detecting the particular memory event, the memory based on the plurality of object statistics.

8. The processing apparatus of claim 7, wherein the object and tag are associated in a memory allocation instruction.

9. The processing apparatus of claim 7, wherein the object and tag are associated in a variable definition or in an object allocation instruction for object storage.

10. The processing apparatus of claim 7, wherein the tag is associated with the object upon receipt of a memory allocation instruction.

11. The processing apparatus of claim 7, further comprising:

a plurality of object tracking tables; and a plurality of memory controllers, wherein:

there is a one-to-one correspondence between one of the plurality of object tracking tables and one of the plurality of memory controllers, and table entries are entered in each object tracking table for the object and the tag.

12. The processing apparatus of claim 7, wherein the tag further comprises an object identification parameter selected from a pool of object identification parameters.

13. A non-transitory computer readable medium including instructions, which when executed in a processing apparatus, cause the processing apparatus to execute instructions for tracking an object to optimize allocation of a memory, the instructions causing the processing apparatus to perform operations comprising:

counting a number of access requests to the object, wherein the object is a memory allocation having a sub-page size, the memory allocation comprising two or more address ranges of memory addresses;

associating a tag with the object, wherein the tag is associated with memory addresses in the two or more address ranges, the two or more address ranges each comprising a plurality of memory addresses;

adding the tag into a translation lookaside buffer entry associated with a memory address at which the object resides, wherein the translation lookaside buffer entry also includes an address translation associated with the memory address; and in response to the number of access requests exceeding a predetermined threshold:

adding a separate table entry in an object tracking table for each address range of the two or more address ranges of the object and the tag, wherein each of the separate table entries in the object tracking table maintains a plurality of object statistics for a plurality of memory events;

updating an object statistic for an occurrence of an associated memory event;

designating a designated memory for a particular memory event; and allocating, in response to detecting the particular memory event, the memory based on the plurality of object statistics.

14. The non-transitory computer readable medium of claim 13, wherein the tag is one of an object identification parameter selected from a pool of object identification parameters.

15. The method of claim 1, further comprising:

on a condition that the number of access requests does not exceed the predetermined threshold:

ignoring the tag.

16. The processing apparatus of claim 7, wherein the memory controller is further configured to:

on a condition that the number of access requests does not exceed the predetermined threshold:

ignore the tag.

17. The method of claim 1, wherein the address translation includes a virtual address and a physical address, wherein the tag is different from both the virtual address and the physical address.

18. The processing apparatus of claim 7, wherein the address translation includes a virtual address and a physical address, wherein the tag is different from both the virtual address and the physical address.

19. The non-transitory computer readable medium of claim 13, wherein the address translation includes a virtual address and a physical address, wherein the tag is different from both the virtual address and the physical address.

* * * * *